United States Patent
Sugawara

(10) Patent No.: US 7,636,141 B2
(45) Date of Patent: Dec. 22, 2009

(54) LIQUID CRYSTAL COLOR DISPLAY

(75) Inventor: Masayuki Sugawara, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/363,364

(22) PCT Filed: Jul. 4, 2002

(86) PCT No.: PCT/JP02/06807

§ 371 (c)(1),
(2), (4) Date: Feb. 28, 2003

(87) PCT Pub. No.: WO03/005111

PCT Pub. Date: Jan. 16, 2003

(65) Prior Publication Data

US 2003/0174265 A1    Sep. 18, 2003

(30) Foreign Application Priority Data

Jul. 5, 2001  (JP) .............................. 2001-204372

(51) Int. Cl.
G02F 1/1335 (2006.01)
(52) U.S. Cl. .......................... 349/108; 349/61; 349/106
(58) Field of Classification Search ............. 349/61–65, 349/69, 106–109
See application file for complete search history.

(56) References Cited

U.S. PATENT DOCUMENTS 4,870,484 A * 9/1989 Sonehara .................... 348/791

FOREIGN PATENT DOCUMENTS

| JP | 5-232579 A | 9/1993 |
|---|---|---|
| JP | 07-031028 | 10/1995 |
| JP | 07-031032 | 10/1995 |
| JP | 07-253577 A | 10/1995 |
| JP | 07-261167 A | 10/1995 |

OTHER PUBLICATIONS

Tohru Tamura, "Influence of Color Gamut on Skin Color Quality", Journal of ITE'99, 1999 ITE Annual Convention, 7-8, pp. 109-110 (1999).

* cited by examiner

Primary Examiner—Dung T. Nguyen
(74) Attorney, Agent, or Firm—Ladas & Parry LLP

(57) ABSTRACT

A liquid crystal color display with a color filter having plural pixels of 3 colors of red, green, and blue, plural light shutters which control a transmitting light quantity of each pixel by opening and closing a liquid crystal, and a light source; when a wavelength of the maximum green pixel transmittance of the above color filter is $\lambda$, an average of normalized emitting spectrum of light source (brightness when maximum value is 1), in range of $\lambda \pm 3$ nm, is 0.1 or higher; and a wavelength of a coinciding point, of transmittance of blue pixel whose wavelength is longer than the peak wavelength of the transmitting wavelength band of blue pixel of a color filter, and transmittance of green pixel whose wavelength is shorter than the peak wavelength of the transmitting wavelength band of green pixel of a color filter, is 500 nm or shorter.

3 Claims, 11 Drawing Sheets

LIQUID CRYSTAL COLOR DISPLAY

TECHNICAL FIELD

The present invention relates to a liquid crystal color display, particularly relates to a transmitting type liquid crystal color display with a backlight.

BACKGROUND ART

A liquid crystal display is a kind of a flat type display. The use of a liquid crystal display is increasing as a solution to shortcomings of a cathode ray tube (abbreviated to CRT), a typical conventional electric display, that is, the depth and the weight. At the beginning, a liquid crystal display was a monochrome display, but the full colorization of a liquid crystal display was an inevitable request because a CRT has been providing a full color display for a long time.

A conventional liquid crystal color display was mainly used for office equipments such as a word processor and personal computer which displays letters, graphics, charts, tables, and the like in color. For the conventional display, a color purity of the 3 primary colors of red, green, and blue will be improved if the value of the film thickness of a color filter or the concentration of a pigment is made higher, but to the contrary, a transmittance of a color filter will decrease causing a dark display image. Therefore, for a liquid crystal display for a note type personal computer, the transmittance was thought to be more important than the color purity to obtain brighter display with a low electric power consumption light source so that the driving hour of a battery is made longer.

However, a wide use of a fixed type liquid crystal display demands a color purity of a CRT level. Moreover, a possibility of an animation display with a liquid crystal display with the advance of technology demands a high color purity of red, green, and blue, and a high color reproduction of a half tone display including flesh color. Therefore, for an example, a light source with a narrow band spectral property is used for a light source of a liquid crystal color display. The peak wavelength of the light source and the peak wavelength of the transmitting wavelength band of each color filter element are almost coincided so that an excellent color reproduction property is obtained by increasing the color purity of a liquid crystal color display (Japanese Patent Application Laid-open No. 7-253577, and No. 7-261167).

DISCLOSURE OF INVENTION

For color display of a color television with a CRT, a color display by a National Television System Committee (abbreviated to NTSC) system is a conventional standard. With this background, a NTSC system is also a standard system for a television display by a liquid crystal color display. In contrast, it is reported (1999 annual conference of The Institute of Image Information and Television Engineers 7-8 pages 109-110) that to be allowed as a flesh color of a liquid crystal color display, an area of a triangle region which connects the 3 primary colors of red, green, and blue on a chromaticity diagram needs to be a color gamut of 50% or more area of the color gamut by NTSC system (50% rate or more against NTSC).

However, a color reproduction region of red, green, and blue, especially green color reproduction region of a conventional liquid crystal color display is small, the reproduction of a real image was not satisfactory.

The present invention has been achieved in view of the above actual situation. The object of the present invention is to provide a liquid crystal color display which enables television display with an excellent half tone display such as flesh color, and a high quality.

In order to attain the aforementioned object, in the present invention, of a liquid crystal color display with a color filter having plural pixels of 3 colors of red, green, and blue, plural light shutters which control a transmitting light quantity of each pixel by opening and closing a liquid crystal, and a light source, the composition is made so that, when a wavelength of the maximum green pixel transmittance of a color filter is $\lambda$, an average of normalized emitting spectrum of light source (brightness when maximum value is 1), in range of $\lambda\pm 3$ nm, is 0.1 or higher, and also, a wavelength of a coinciding point of transmittance of blue pixel whose wavelength is longer than the peak wavelength of the transmitting wavelength band of blue pixel of a color filter, and transmittance of green pixel whose wavelength is shorter than the peak wavelength of the transmitting wavelength band of green pixel of a color filter, is 500 nm or shorter.

Moreover, in the present invention, of a liquid crystal color display with a color filter having plural pixels of 3 colors of red, green, and blue, plural light shutters which control a transmitting light quantity of each pixel by opening and closing a liquid crystal, and a light source, the composition is made so that, when a wavelength of the maximum green pixel transmittance of a color filter is $\lambda$, an average of normalized emitting spectrum of light source (brightness when maximum value is 1), in range of $\lambda\pm 3$ nm, is 0.2 or higher Still more, in the present invention, of a liquid crystal color display with a color filter having plural pixels of 3 colors of red, green, and blue, plural light shutters which control a transmitting light quantity of each pixel by opening and closing a liquid crystal, and a light source, the composition is made so that a wavelength of a coinciding point of transmittance of blue pixel whose wavelength is longer than the peak wavelength of the transmitting wavelength band of blue pixel of a color filter, and transmittance of green pixel whose wavelength is shorter than the peak wavelength of the transmitting wavelength band of green pixel of a color filter, is 490 nm or shorter.

For a preferable embodiment in the present invention, a fluorescent lamp may be used as the light source.

For a preferable embodiment in the present invention, a light emitting diode may be used as the light source.

For a preferable embodiment in the present invention, an electroluminescence element may be used as the light source.

According to the present invention, when a wavelength of the maximum green pixel transmittance of a color filter is $\lambda$, an average of normalized emitting spectrum of light source, in range of $\lambda\pm 3$ nm, is 0.1 or higher, and also, a wavelength of a coinciding point of transmittance of blue pixel whose wavelength is longer than the peak wavelength of the transmitting wavelength band of blue pixel of a color filter and transmittance of green pixel whose wavelength is shorter than the peak wavelength of the transmitting wavelength band of green pixel of a color filter, is 500 nm or shorter. Otherwise, when a wavelength of the maximum green pixel transmittance of a color filter is $\lambda$, an average of normalized emitting spectrum of light source, in range of $\lambda\pm 3$ nm, is 0.2 or higher, or, a wavelength of a coinciding point of transmittance of blue pixel whose wavelength is longer than the peak wavelength of the transmitting wavelength band of blue pixel of a color filter, and transmittance of green pixel whose wavelength is shorter than the peak wavelength of the transmitting wavelength band of green pixel of a color filter, is 490 nm or shorter. The above conditions enable the rate against NTSC to be 50% or more, therefore, a high quality image liquid crystal color display with high color purity and excellent color reproduction property can be obtained.

BEST MODE FOR CARRYING OUT THE INVENTION

Figure 1:
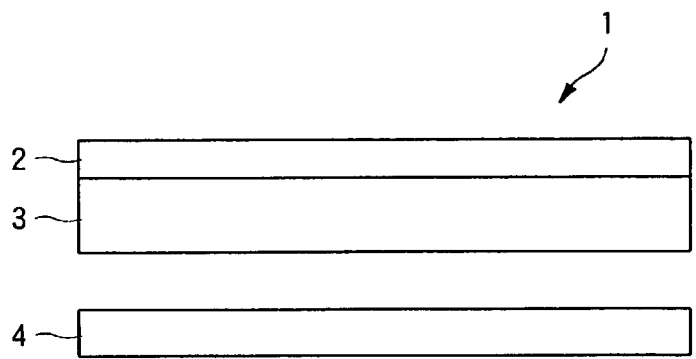
FIG. 1 is a brief drawing showing a composition of liquid crystal color display of the present invention.

Hereinafter, the best mode for carrying out the present invention will be explained referring to the drawings.

FIG. 1 is a brief drawing showing a composition of liquid crystal color display of the present invention. In FIG. 1, liquid crystal color display 1 is a transmitting type liquid crystal display with a color filter 2 having plural pixels of 3 colors of red, green, and blue, plural light shutters 3 which control a transmitting light quantity of each pixel by opening and closing a liquid crystal, and a light source 4.

The color filter 2 has pixel composition of red pattern, green pattern, and blue pattern arranged in a desired pattern configuration on a transparent substrate, and generally, a black matrix is formed in between each pixel.

The light shutter 3 controls a transmitting light quantity of each pixel by opening and closing a liquid crystal, and has minute plural pixel arrangements. For this light shutter 3, a known operating mode which is used for liquid crystal display conventionally may be adopted. For example, a TN mode may be adopted for an active matrix type and a STN mode may be adopted for a simple matrix type.

The light source 4 is usually a thin type white pack light. A fluorescent lamp, a light emitting diode, an electroluminescence element, and the like may be used. Considering a color filter to be used, a light source may be selected suitably to meet the below conditions.

Figure 2:
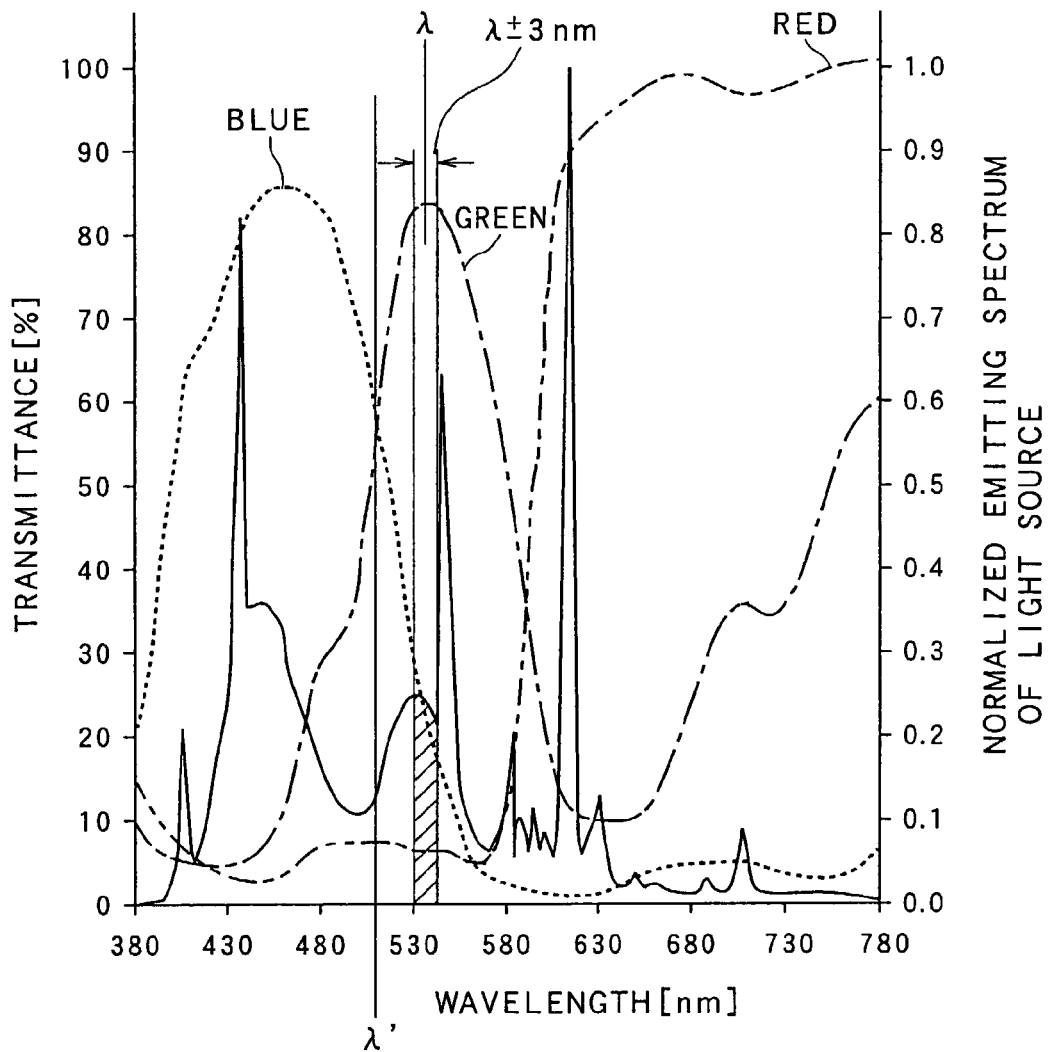
FIG. 2 is a chart showing transmitting property of a color filter and spectral property of a light source.

FIG. 2 is a chart showing an example of transmitting property of the color filter 2 with a broken line, an alternate long and short dash line, and an alternate long and 2 short dash line, and showing an example of spectral property of the light source 4 with a solid line. As shown in FIG. 2, in the present invention, when a wavelength of the maximum green pixel transmittance of a color filter 2 is λ, an average of normalized emitting spectrum of light source 4 (brightness when maximum value is 1), in range of λ±3 nm (the area shown with diagonal lines in FIG. 2), is 0.1 or higher. Wherein a wavelength λ' of a coinciding point of transmittance of blue pixel whose wavelength is longer than the peak wavelength of the transmitting wavelength band of blue pixel of the color filter 2, and transmittance of green pixel whose wavelength is shorter than the peak wavelength of the transmitting wavelength band of green pixel of the color filter 2, is 500 nm or shorter.

Figure 3:
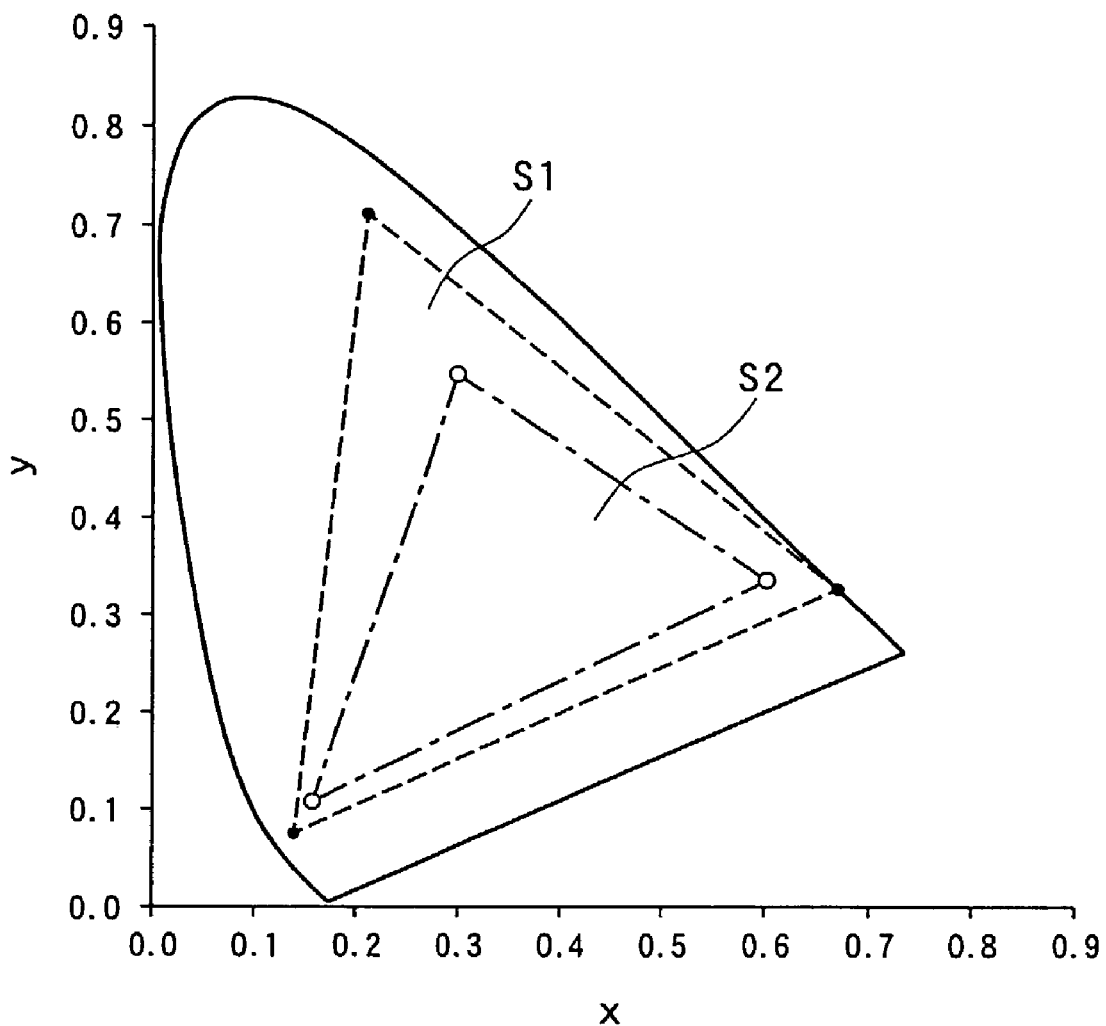
FIG. 3 is a chart showing a color gamut of NTSC and a color gamut of a liquid crystal color display of the present invention, by CIE xy chromaticity diagram.
Figure 4:
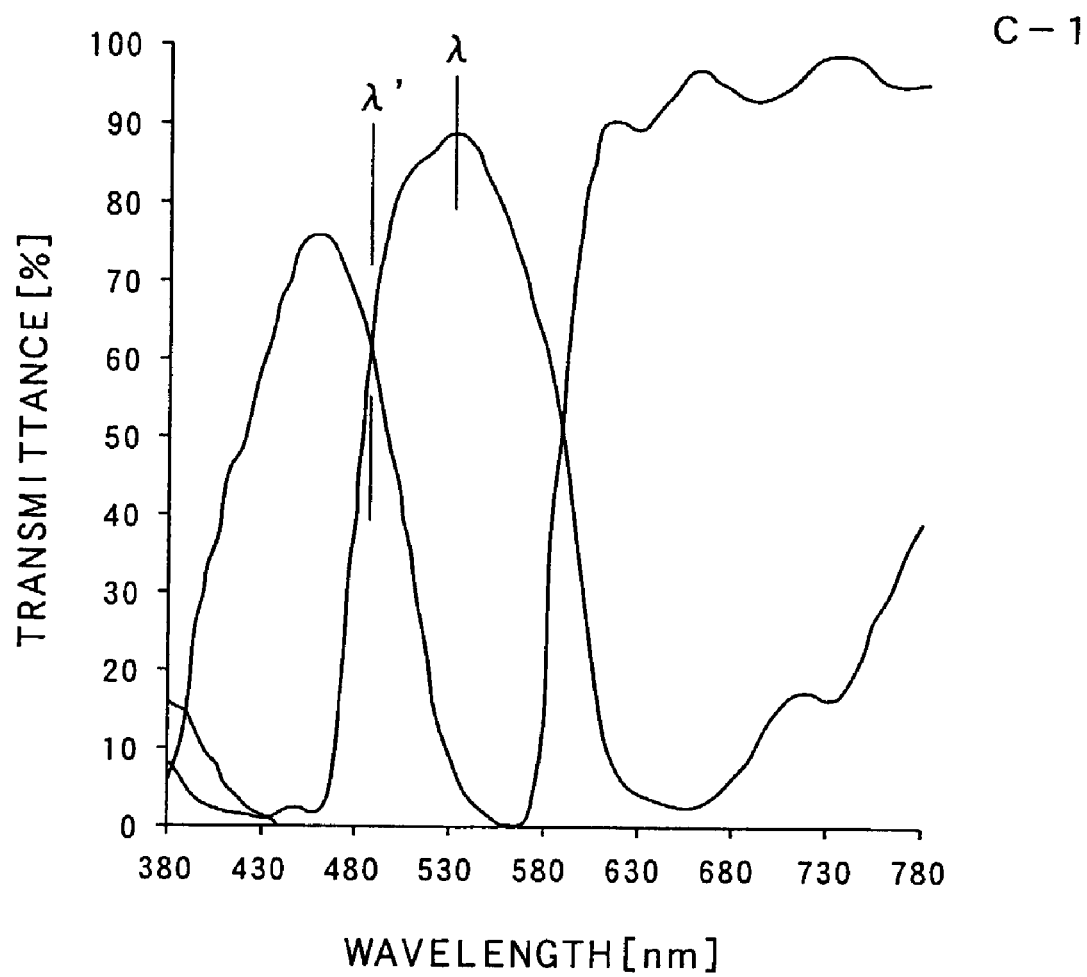
FIG. 4 is a chart showing transmitting property of a color filter used in the examples.
Figure 5:
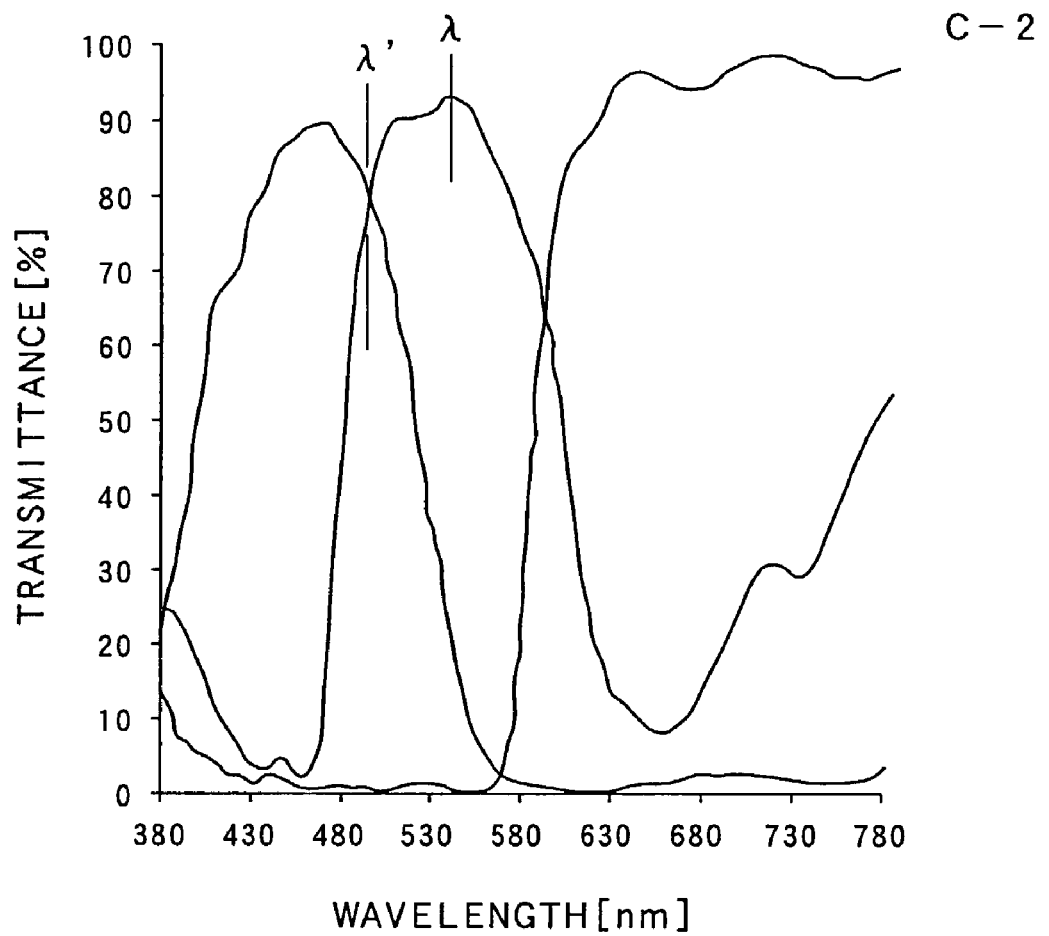
FIG. 5 is a chart showing transmitting property of a color filter used in the examples.
Figure 6:
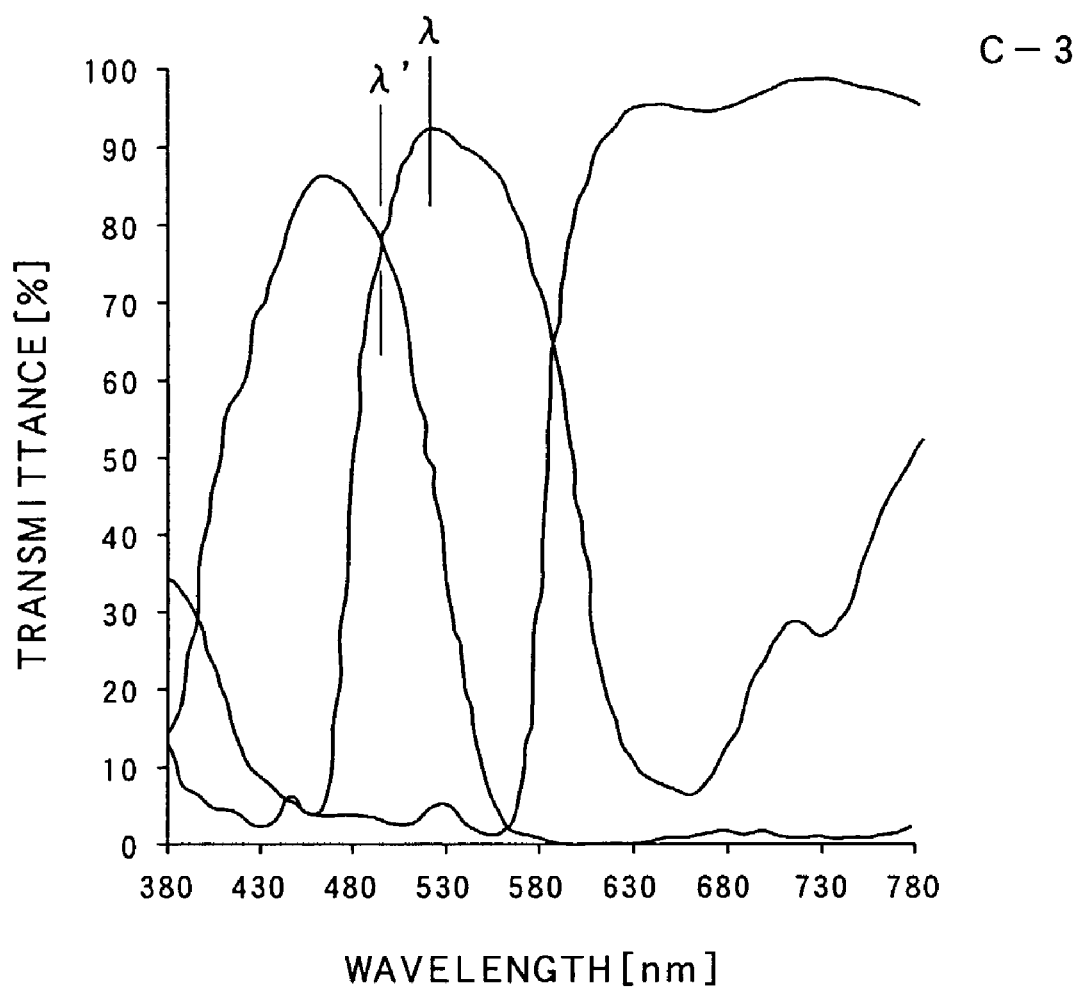
FIG. 6 is a chart showing transmitting property of a color filter used in the examples.
Figure 7:
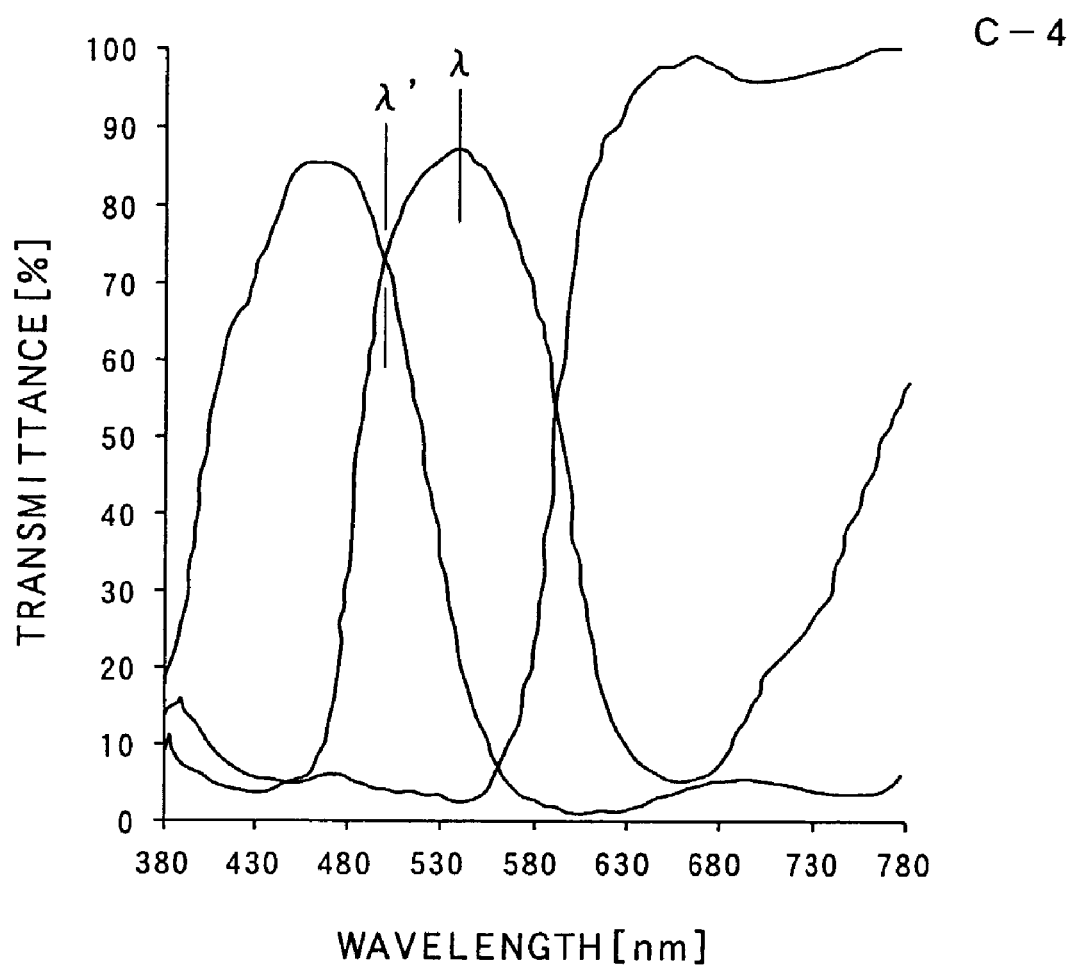
FIG. 7 is a chart showing transmitting property of a color filter used in the examples.
Figure 8:
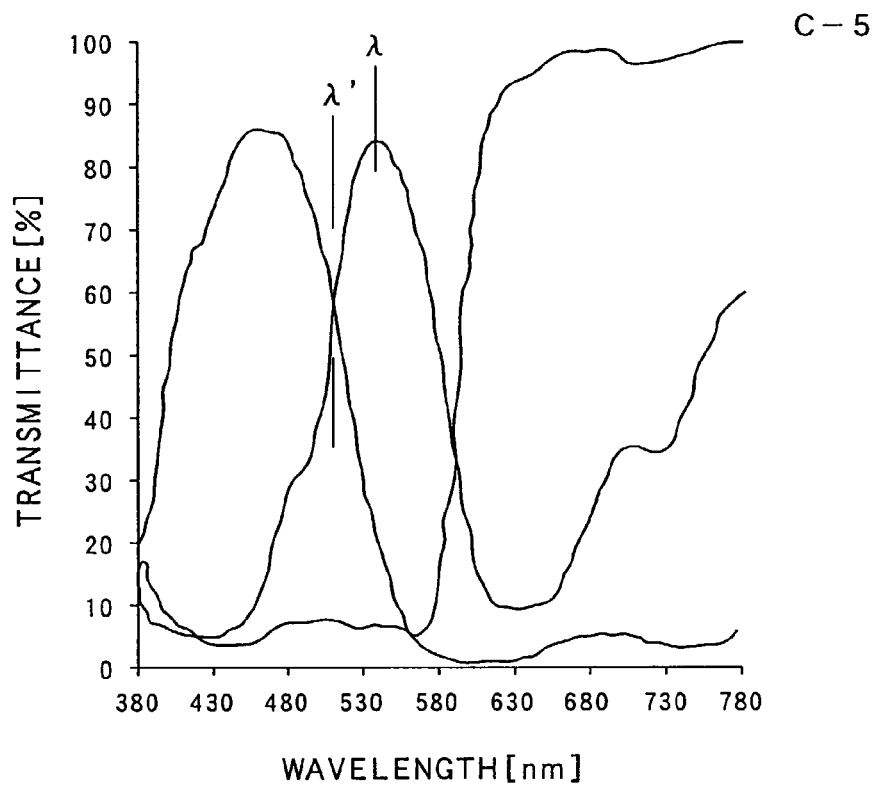
FIG. 8 is a chart showing transmitting property of a color filter used in the examples.
Figure 9:
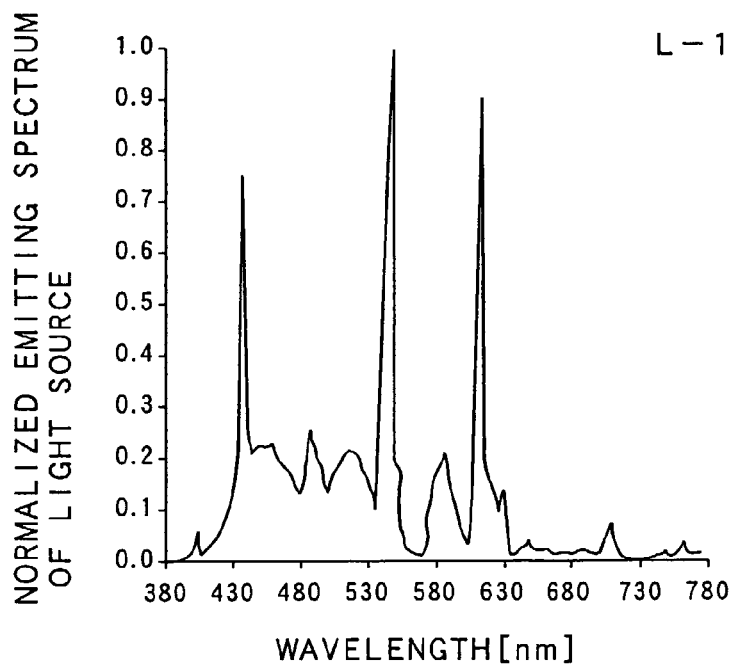
FIG. 9 is a chart showing spectral property of a light source used in example 1.
Figure 10:
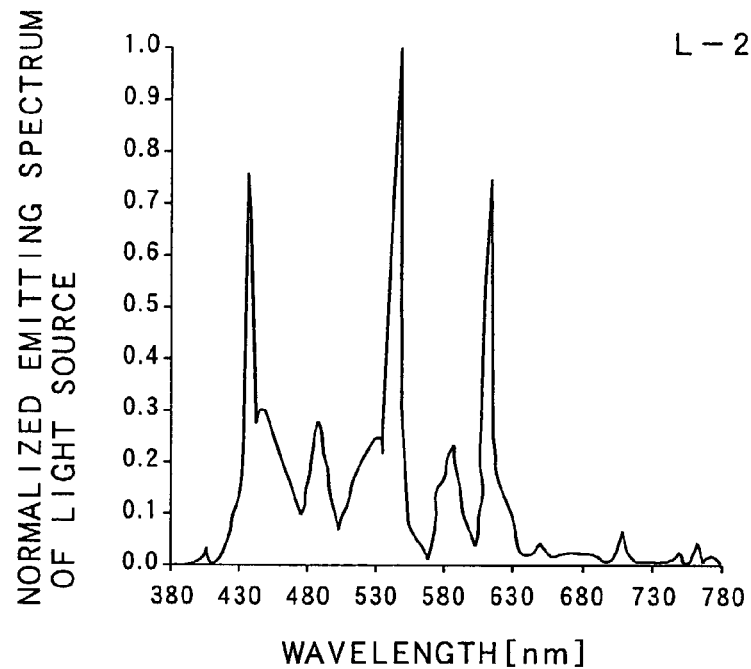
FIG. 10 is a chart showing spectral property of a light source used in example 1.
Figure 11:
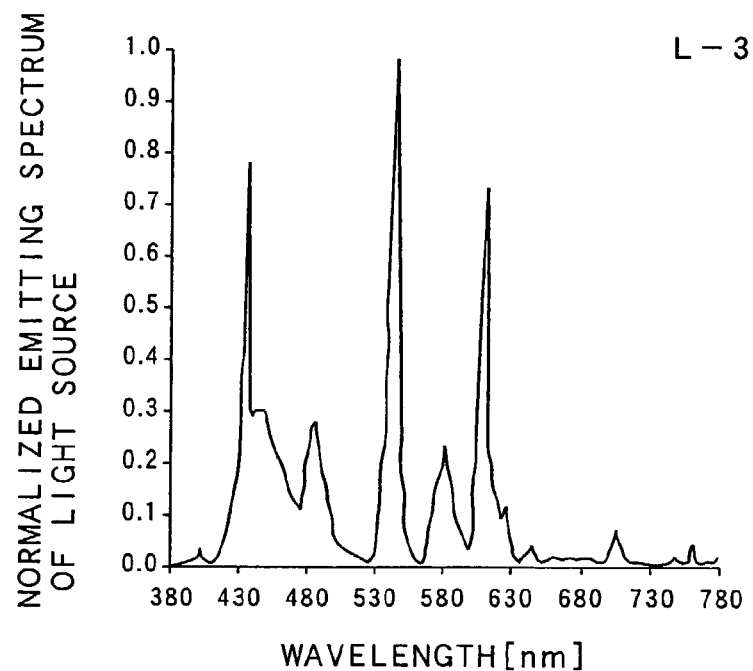
FIG. 11 is a chart showing spectral property of a light source used in example 1.
Figure 12:
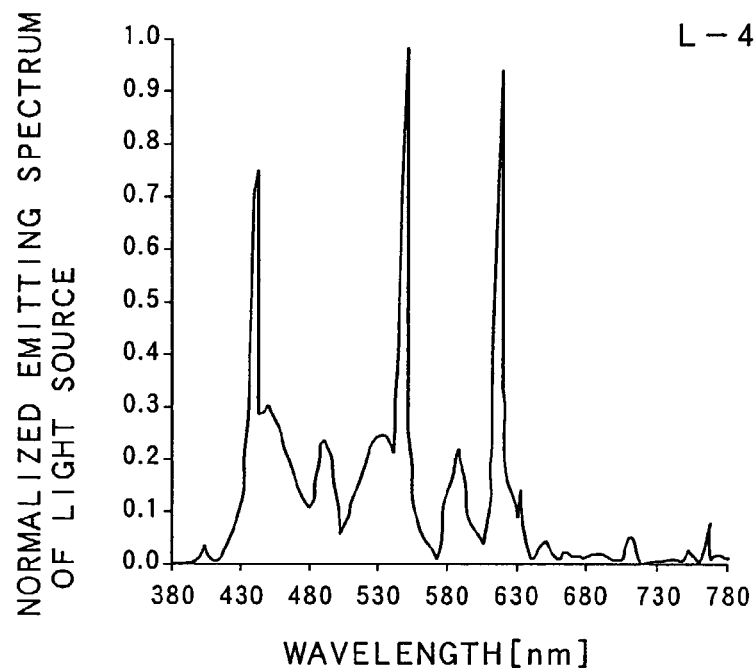
FIG. 12 is a chart showing spectral property of a light source used in example 1.
Figure 13:
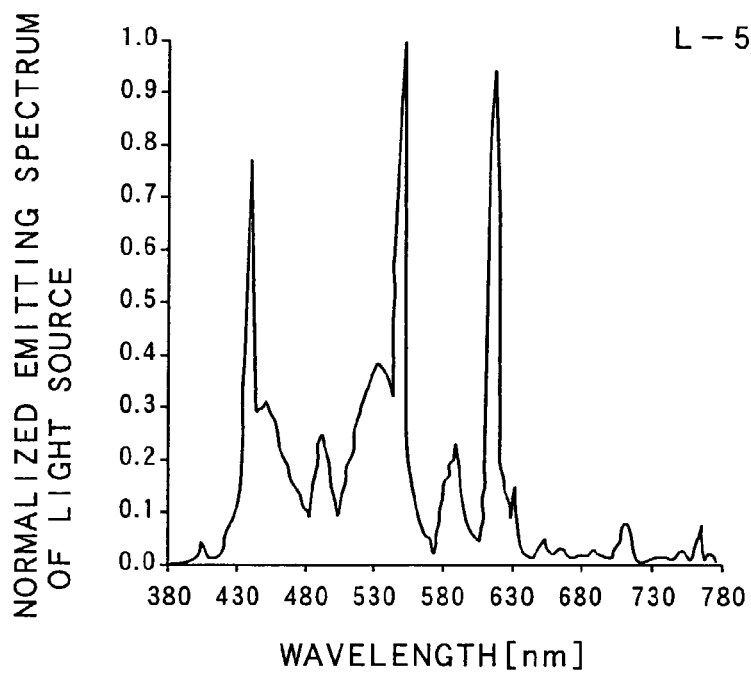
FIG. 13 is a chart showing spectral property of a light source used in example 1.

Moreover, FIG. 3 is a chart showing a color gamut of NTSC (the triangle drawn with a broken line) and a color gamut of a liquid crystal color display of the present invention (the triangle drawn with an alternate long and short dash line), by CIE xy chromaticity diagram. The rate (S2/1×100) of area S2 of the color gamut of a liquid crystal color display against the area S1 of color gamut by NTSC, in FIG. 3, is stated as a rate against NTSC. When the rate against NTSC is high, a color purity of the 3 primary colors, red, green, and blue, is high, and real image reproduction property is excellent. By making the rate against NTSC 50% or higher, a display image of an allowable flesh color will be possible.

In the present invention, the rate against NTSC will be 50% or higher, if the color filter 2 and the light source 4 meet the above condition. Therefore, a liquid crystal color display of the present invention has an excellent half tone display such as flesh color and high quality television image display is possible.

Further, when a region which regulates an average of normalized emitting spectrum of light source 4 is larger than the region set in the present invention (±3 nm), for example, ±5 nm of a wavelength λ of the maximum green pixel transmittance, a linear property of a relationship between the normalized emitting spectrum of light source and the rate against NTSC will collapse. It is not preferable because the control to make the rate against NTSC 50% or higher will be unstable.

Moreover in the present invention, when a wavelength of the maximum green pixel transmittance of a color filter 2 is λ, an average of normalized emitting spectrum of light source 4 (brightness when maximum value is 1), in range of λ±3 nm, is set to be 0.2 or higher. As described in the above, by setting the normalized emitting spectrum of light source higher than the case in the above, the rate against NTSC will be 50% or higher regardless of the intersection wavelength λ' of the blue pixel transmittance curve and green pixel transmittance curve. Therefore, a liquid crystal color display of the present invention will make an image display of an allowable flesh color possible.

Still more, in the present invention, a wavelength λ' of a coinciding point of transmittance of blue pixel whose wavelength is longer than the peak wavelength of the transmitting wavelength band of blue pixel of a color filter 2, and transmittance of green pixel whose wavelength is shorter than the peak wavelength of the transmitting wavelength band of green pixel of a color filter is set to be 490 nm or shorter. By setting the intersection wavelength λ' of the blue pixel transmittance curve and green pixel transmittance curve shorter than the above case, the rate against NTSC will be 50% or higher regardless of the above normalized emitting spectrum of light source. Therefore, a liquid crystal color display of the present invention will make an image display of an allowable flesh color possible.

The present invention is not limited to the above-mentioned embodiments. The above-mentioned embodiments are merely examples, and any one having the substantially same structure as the technological idea described in the claims of the present invention and having the same effects may be included in the technological scope of the present invention.

EXAMPLES

The present invention will be further explained by way of Examples.

Example 1

As color filters, 5 kinds of color filters C-1~C-5 having a transmitting property shown in FIG. 4~FIG. 8 were prepared. The wavelength λ of the maximum green pixel transmittance and intersection wavelength λ', of the blue pixel transmittance curve and green pixel transmittance curve, of each color filter are shown in the below Table 1. A spectral calorimeter OSP-SP200 produced by Olympus Optical Co., LTD. was used for measuring transmitting property.

Moreover as light sources, 5 kinds of 3 band tubes L-1~L-5 having a spectral property shown in FIG. 9~FIG. 13 were prepared. For each light source (L-1~L-5), combining with the above 5 kinds of color filters (C-1~C-5), averages of normalized emitting spectrum of light source (brightness when maximum value is 1), in range of λ±3 nm, were calculated and shown in the below Table 1. A spectral luminance meter SR-3 produced by Topcon Co. was used for measuring spectral property.

Next, the 5 kinds of color filters (C-1~C-5) and the 5 kinds of light sources (L-1~L-5) of the above were each combined to produce simple matrix type liquid crystal color display (sample 1~sample 25). For each liquid crystal color display, the area S2 of color gamut in the chromaticity diagram was calculated, and the rate (S2/S1×100) against the area S1 of color gamut by NTSC was calculated and shown in the below Table 1. Still more, a spectral luminance meter SR-3 produced by Topcon Co. was used for measuring chromaticity, the spectral luminance meter was placed in the direction of a normal line against the center of the display, and an observation distance was 50 cm, under condition of no incident light from circumference.

Furthermore, for each liquid crystal color display, a specific image (NIA) including a person from high definition color digital standard data (reference ISO/JIS-SCID JIS X9201, Japan Standards Association) was displayed. This image was evaluated by the below mentioned method and the results are shown in the below Table 1.

Method of Evaluating an Image

An image for evaluation was displayed in the center of the produced liquid crystal color display and a CRT screen. These images were evaluated by 5 phase evaluation scale. Subjects were 50 adults who are 25 to 35 years old with emmetropia (including corrected eyesight). A normal visibility distance (50 cm-70 cm) for watching a display was adopted as an observation distance, and the displays were observed from the direction of the normal line against the display surfaces. Among each liquid crystal color display, a liquid crystal color display with an average evaluation value of 3.5 or more, that is an equivalent evaluation of CRT, was evaluated as "good".

TABLE 1

| Liquid crystal color display | Color filter | Light source No. | Average of normalized emitting spectrum of light source (%) | Rate against NTSC | Display evaluation |
|---|---|---|---|---|---|
| Sample 1 | C-1 | L-1 | 0.140 | 72.6 | Good |
| Sample 2 | (λ = 531 nm) | L-2 | 0.249 | 73.9 | Good |
| Sample 3 | (λ' = 531 nm) | L-3 | 0.020 | 66.1 | Good |
| Sample 4 | | L-4 | 0.249 | 75.8 | Good |
| Sample 5 | | L-5 | 0.373 | 78.5 | Good |
| Sample 6 | C-2 | L-1 | 0.102 | 55.1 | Good |
| Sample 7 | (λ = 536 nm) | L-2 | 0.234 | 56.1 | Good |
| Sample 8 | (λ' = 490 nm) | L-3 | 0.067 | 51.9 | Good |
| Sample 9 | | L-4 | 0.234 | 57.6 | Good |
| Sample 10 | | L-5 | 0.350 | 58.6 | Good |
| Sample 11 | C-3 | L-1 | 0.208 | 50.9 | Good |
| Sample 12 | (λ = 518 nm) | L-2 | 0.193 | 51.1 | Good |
| Sample 13 | (λ' = 518 nm) | L-3 | 0.028 | 47.9 | Bad |
| Sample 14 | | L-4 | 0.193 | 52.7 | Good |
| Sample 15 | | L-5 | 0.289 | 53.1 | Good |
| Sample 16 | C-4 | L-1 | 0.117 | 50.0 | Good |
| Sample 17 | (λ = 534 nm) | L-2 | 0.242 | 50.3 | Good |
| Sample 18 | (λ' = 495 nm) | L-3 | 0.034 | 46.7 | Bad |
| Sample 19 | | L-4 | 0.242 | 51.7 | Good |
| Sample 20 | | L-5 | 0.363 | 52.3 | Good |
| Sample 21 | C-5 | L-1 | 0.102 | 49.6 | Bad |
| Sample 22 | (λ = 536 nm) | L-2 | 0.234 | 50.2 | Good |
| Sample 23 | (λ' = 510 nm) | L-3 | 0.067 | 47.9 | Bad |
| Sample 24 | | L-4 | 0.234 | 51.7 | Good |
| Sample 25 | | L-5 | 0.350 | 51.5 | Good |

As shown in Table 1, for every liquid crystal color display comprising a combination of a light source whose average of normalized emitting spectrum of light source in a range of λ±3 nm is 0.1 or higher, and a color filter whose intersection wavelength λ' of the blue pixel transmittance curve and green pixel transmittance curve is 500 nm or shorter, the rate against NTSC was 50% or more and the evaluation for the display of the image including flesh color image was good. Especially, when a color filter whose intersection wavelength λ' of the blue pixel transmittance curve and green pixel transmittance curve is 490 nm or shorter is used, the rate against NTSC was 50% or more and the evaluation for the display of the image including flesh color image was good, even the average of normalized emitting spectrum of light source in a range of λ±3 nm is lower than 0.1 (sample 3 and sample 8).

On the other hand, even the average of normalized emitting spectrum of light source in a range of λ±3 nm is 0.1 or higher, the rate against NTSC was less than 50% and the evaluation for the display of the image including flesh color image was bad, if a color filter whose intersection wavelength λ' of the blue pixel transmittance curve and green pixel transmittance curve is longer than 500 nm was combined into a liquid crystal color display (sample 21).

Furthermore, in a liquid crystal color display using a light source whose average of normalized emitting spectrum in a range of λ±3 nm is 0.2 or higher (samples 2, 4, 5, 7, 9, 10, 11, 15, 17, 19, 20, 22, 24, and 25), the rate against NTSC was 50% or more and the evaluation for the display of the image including flesh color image was good regardless of the intersection wavelength λ' of the blue pixel transmittance curve and green pixel transmittance curve.

Example 2

Figure 14:
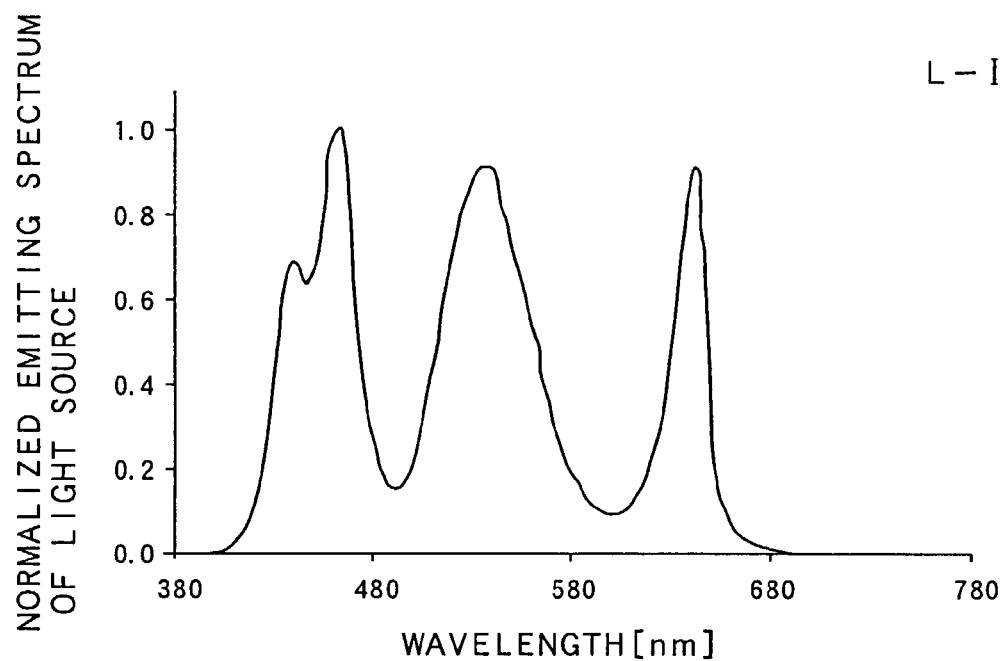
FIG. 14 is a chart showing spectral property of a light source used in example 2.
Figure 15:
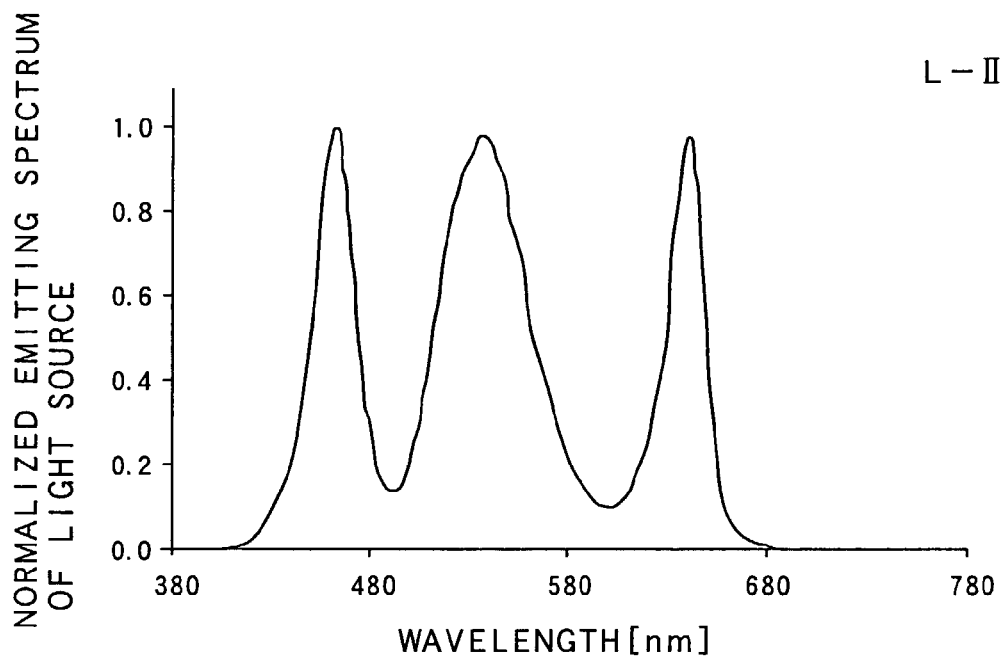
FIG. 15 is a chart showing spectral property of a light source used in example 2.
Figure 16:
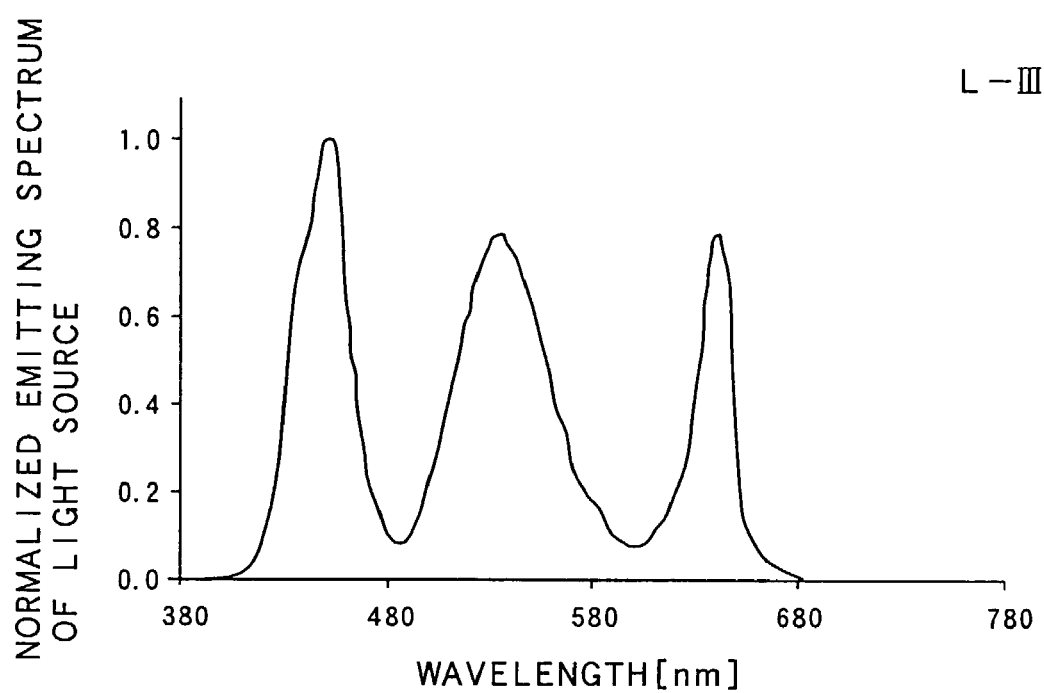
FIG. 16 is a chart showing spectral property of a light source used in example 2.

5 kinds of color filters C-1~C-5, same as Example 1, were prepared. And for light sources, 3 kinds of light emitting diodes L-I~L-III having a spectral property shown in FIG. 14~FIG. 16 were prepared. For each light source (L-I~L-III), combined with the above 5 kinds of color filters (C-1~C-5), averages of normalized emitting spectrum of light source (brightness when maximum value is 1), in range of $\lambda \pm 3$ nm, were calculated and shown in the below Table 2. A spectral luminance meter SR-3 produced by Topcon Co. was used for measuring spectral property.

Next, the 5 kinds of color filters (C-1~C-5) and 3 kinds of light sources (L-I~L-III) were each combined to produce simple matrix type liquid crystal color display (sample I~sample XV). For each liquid crystal color display, the area S2 of color gamut in the chromaticity diagram was calculated, and the rate (S2/S1×100) against the area S1 of color gamut by NTSC was calculated and shown in the below Table 2. Still more, a spectral luminance meter SR-3 produced by Topcon Co. was used for measuring chromaticity, the spectral luminance meter was placed in the direction of a normal line against the center of the display, and an observation distance was 50 cm, under condition of no incident light from circumference.

Furthermore, for each liquid crystal color display, images were evaluated by the same method as Example 1. The results are shown in the below Table 2.

TABLE 2

| Liquid crystal color display | Color filter | Light Source No. | Average of normalized emitting spectrum of light source (%) | Rate against NTSC | Display evaluation |
|---|---|---|---|---|---|
| Sample I | C-1 | L-I | 0.904 | 88.5 | Good |
| Sample II | ($\lambda$ = 531 nm) | L-II | 0.963 | 86.9 | Good |
| Sample III | ($\lambda'$ = 485 nm) | L-III | 0.785 | 90.6 | Good |
| Sample IV | C-1 | L-I | 0.901 | 68.3 | Good |
| Sample V | ($\lambda$ = 536 nm) | L-II | 0.970 | 65.2 | Good |
| Sample VI | ($\lambda'$ = 490 nm) | L-III | 0.782 | 70.0 | Good |
| Sample VII | C-1 | L-I | 0.709 | 58.0 | Good |
| Sample VIII | ($\lambda$ = 518 nm) | L-II | 0.724 | 57.9 | Good |
| Sample IX | ($\lambda'$ = 492 nm) | L-III | 0.613 | 58.9 | Good |
| Sample X | C-1 | L-I | 0.908 | 55.7 | Good |
| Sample XI | ($\lambda$ = 534 nm) | L-II | 0.974 | 54.7 | Good |
| Sample XII | ($\lambda'$ = 495 nm) | L-III | 0.788 | 57.4 | Good |
| Sample XIII | C-1 | L-I | 0.901 | 51.6 | Good |
| Sample XIV | ($\lambda$ = 536 nm) | L-II | 0.970 | 50.6 | Good |
| Sample XV | ($\lambda'$ = 510 nm) | L-III | 0.782 | 53.8 | Good |

As shown in the above Table 2, because every liquid crystal color display uses a light source whose average of normalized emitting spectrum, in range of $\lambda \pm 3$ nm, is 0.2 or higher, the rate against NTSC was 50% or more and the evaluation for the display of the image including flesh color image was good.

The invention claimed is:

1. A liquid crystal color display comprising a color filter having plural pixels of 3 colors of red, green, and blue, plural light shutters which controls a transmitting light quantity of each pixel by opening and closing a liquid crystal, and a light source which is a 3 band tube,
   wherein an average of normalized emitting spectrum of light source (brightness when maximum value is 1), in range of $\lambda \pm 3$ nm when a wavelength of the maximum green pixel transmittance of a color filter is $\lambda$, is in a range of 0.1 to 0.373 and
   a wavelength of a coinciding point of transmittance of blue pixel whose wavelength is longer than the peak wavelength of the transmitting wavelength band of blue pixel of a color filter, and transmittance of green pixel whose wavelength is shorter than the peak wavelength of the transmitting wavelength band of green pixel of a color filter, is 500 nm or shorter.

2. The liquid crystal color display according to claim 1, wherein the wavelength $\lambda$ is in a range of 518 to 536 nm.

3. The liquid crystal color display according to claim 1, wherein the wavelength of a coinciding point of transmittance of blue pixel whose wavelength is longer than the peak wavelength of the transmitting wavelength band of blue pixel of a color filter, and transmittance of green pixel whose wavelength is shorter than the peak wavelength of the transmitting wavelength band of green pixel of the color filter, is 490 nm or shorter.

* * * * *